(12) United States Patent
Pollak

(10) Patent No.: US 12,043,555 B1
(45) Date of Patent: Jul. 23, 2024

(54) SYSTEM AND METHOD FOR CARBON CAPTURE SURROUNDING UNDERWATER EQUIPMENT

(71) Applicant: Schlumberger Technology Corporation, Sugar Land, TX (US)

(72) Inventor: Joshua Brian Pollak, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/515,529

(22) Filed: Nov. 21, 2023

(51) Int. Cl.
*C02F 1/28* (2023.01)
*C02F 1/00* (2023.01)
*C02F 1/469* (2023.01)
*C02F 101/10* (2006.01)
*C02F 103/08* (2006.01)

(52) U.S. Cl.
CPC ............... *C02F 1/28* (2013.01); *C02F 1/008* (2013.01); *C02F 1/4695* (2013.01); *C02F 2101/10* (2013.01); *C02F 2103/08* (2013.01); *C02F 2201/005* (2013.01); *C02F 2201/006* (2013.01); *C02F 2303/14* (2013.01); *C02F 2303/16* (2013.01); *C02F 2303/20* (2013.01)

(58) Field of Classification Search
None
See application file for complete search history.

(56) References Cited

U.S. PATENT DOCUMENTS

| | | | |
|---|---|---|---|
| 2005/0139530 A1* | 6/2005 | Heiss | C02F 9/00 210/257.2 |
| 2007/0295604 A1* | 12/2007 | Freydina | B01D 61/48 204/627 |
| 2017/0296961 A1* | 10/2017 | Beaumont | B01J 20/28069 |
| 2019/0292960 A1* | 9/2019 | Müller-Hellwig | B01D 53/0415 |

* cited by examiner

*Primary Examiner* — Richard C Gurtowski
(74) *Attorney, Agent, or Firm* — Jeffrey D. Frantz

(57) ABSTRACT

A system includes a carbon capture unit. The carbon capture unit includes a housing having a water inlet, a water outlet, and a water flow path from the water inlet to the water outlet. The carbon capture unit also includes a carbon capture cartridge disposed in the housing along the water flow path, wherein the carbon capture cartridge is configured to capture carbon from water along the water flow path and a mount coupled to the housing. The mount is configured to mount the carbon capture unit at an underwater location having underwater equipment.

22 Claims, 6 Drawing Sheets

SYSTEM AND METHOD FOR CARBON CAPTURE SURROUNDING UNDERWATER EQUIPMENT

BACKGROUND

The present disclosure generally relates to systems and methods for carbon capture surrounding underwater equipment, such a well equipment for a subterranean oil and gas reservoir.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

In subsea applications, various types of infrastructure may be positioned along a sea floor including subsea trees. It is presently known that there is a temperature differential between underwater equipment and ocean water. The higher temperature on various types of infrastructure may support organic growth on the surface of equipment positioned along the sea floor. One disadvantage of the organic growth on the surface of the underwater equipment is that the operation of external components of the underwater equipment may be impacted by the presence of organic growth (e.g., mechanical interference, mechanical stress). For at least this reason, a need exists for developing systems and methods to control organic growth on underwater equipment.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system includes a carbon capture unit. The carbon capture unit includes a housing having a water inlet, a water outlet, and a water flow path from the water inlet to the water outlet. The carbon capture unit also includes a carbon capture cartridge disposed in the housing along the water flow path, wherein the carbon capture cartridge is configured to capture carbon from water along the water flow path and a mount coupled to the housing. The mount is configured to mount the carbon capture unit at an underwater location having underwater equipment.

In certain embodiments, a system includes a carbon capture system. The carbon capture unit includes a carbon capture cartridge and a mount configured to mount the carbon capture unit at an underwater location having underwater equipment. The system includes a controller comprising a memory, a processor, and instructions stored on the memory and executable by the processor to control the carbon capture system to enable a flow of the water along a water flow path through the carbon capture cartridge during a first operational mode. The processor also controls the carbon capture system to adsorb the carbon from the water via the carbon capture cartridge during the first operational mode, wherein the first operational mode comprises an adsorption mode.

In certain embodiments, a system includes operating a carbon capture system underwater to capture carbon from water at an underwater location having underwater equipment, wherein the carbon capture system comprises a carbon capture unit having a carbon capture cartridge and a mount configured to mount the carbon capture unit. The carbon capture system is controlled via a controller comprising a memory, a processor, and instructions stored on the memory and executable by the processor to enable a flow of the water along a water flow path through the carbon capture cartridge during a first operational mode, and adsorb the carbon from the water via the carbon capture cartridge during the first operational mode, wherein the first operational mode comprises an adsorption mode.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
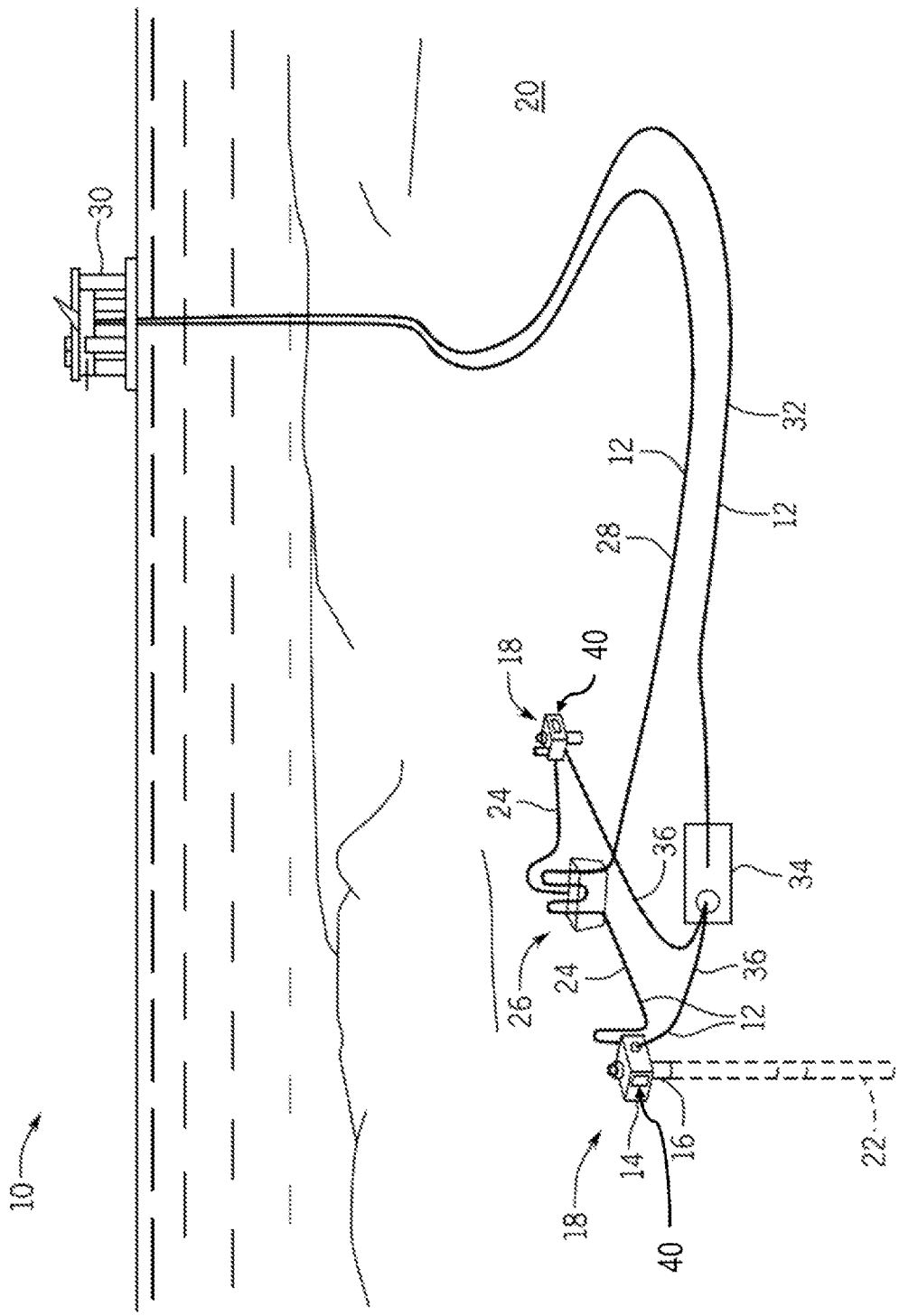
FIG. 1 a schematic view of a subsea system having a plurality of carbon capture systems coupled to subsea equipment, according to an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The present disclosure is generally directed toward systems and methods of carbon capture surrounding underwater equipment, such a well equipment for a subterranean oil and gas reservoir. As discussed above, organic growth (e.g., biological growth, microbial growth, biomass buildup, calcification, biofilms, marine bio-fouling etc.) may be found located on underwater equipment, such as trees (e.g., subsea injection or production trees, etc.), manifolds (e.g., subsea injection or production manifolds), and/or substations (e.g., subsea boosting stations) of the well equipment. Organic growth may be promoted on surfaces of underwater equipment due to increased temperature (e.g., thermal heat produced by underwater equipment and/or fluid flowing through the underwater equipment) and the presence of carbon in ocean water. In context of the present application, any reference to carbon is intended to include any form of carbon in the water, including but not limited to carbonates, carbonic acid, dissolved carbon dioxide ($CO_2$), or any combination thereof. Although the following discussion may refer to $CO_2$ as an example, all other forms of carbon are intended to be captured by the carbon capture system. As discussed below, implementation of a carbon capture system on surfaces of underwater equipment may reduce organic growth and remove carbon dioxide ($CO_2$) directly from ocean water. In some scenarios, removal of carbon dioxide directly from the ocean water surrounding underwater equipment may reduce the need for removal of organic growth from the surface of underwater equipment.

As such, in certain embodiments of the present disclosure, a carbon capture system is coupled to a subsea system in an underwater location to remove carbon from the ocean water surrounding the underwater equipment. A controller controls a carbon capture unit of the carbon capture system to adsorb carbon using a carbon capture cartridge (e.g., electrodeionization, active filtration, passive filtration, bipolar membrane electrodialysis, etc.) to remove carbon from the ocean water resulting in a decrease of organic growth. In certain embodiments, the carbon capture cartridge may include a perforated housing, a frame with screens, or other support structure holding a sorbent material (e.g., particles of sorbent material), such that ocean water can flow through the carbon capture cartridge and the sorbent material can adsorb carbon from the ocean water. For example, an electrodeionization system may be used to reduce carbon dioxide levels within the water. The electrodeionization system may include a membrane demineralization process (e.g., flow of the water under pressure through a semi-permeable membrane) to treat the water and reduce carbon levels in the water after treatment.

In certain embodiments, the carbon capture system includes the carbon capture unit containing the carbon capture cartridge that collects carbon from the ocean water. The carbon capture cartridge can be removed from the carbon capture unit by a remotely operated vehicle (ROV). As such, when the controller assesses that the carbon capture cartridge has adsorbed a threshold amount of carbon, then the ROV can replace the carbon capture cartridge. For example, there may be multiple carbon capture units on the underwater equipment and the ROV may routinely service the carbon capture system during normal operation. In this manner, the carbon capture system substantially reduces or prevents accumulation of organic material on the surface of the underwater equipment.

In certain embodiments, the carbon capture system may include the carbon capture unit, the carbon capture cartridge, fluid handling equipment, and carbon capture storage. As such, the carbon capture system may be controlled by the controller to operate in a first operating mode (e.g., adsorption mode) in which the carbon capture unit adsorbs carbon from the ocean water. As carbon is adsorbed by the carbon capture system, sensor(s) may indicate to the controller that the carbon capture cartridge is at a threshold saturation level that is indicative of need of removal of collected carbon. The carbon capture system may then be controlled by the controller to operate in a second operating mode (e.g., desorption mode) to desorb carbon. As such, the desorption of carbon may produce a fluid output containing carbon. The fluid output containing carbon is handled by the fluid handling equipment including a manifold, a pump, a separator, or a combination of the thereof to produce a gas containing carbon dioxide ($CO_2$). Further, the gas containing carbon dioxide is stored in the carbon capture storage. In this manner, carbon from the ocean water surrounding the underwater equipment is removed and can no longer contribute to promoting organic growth.

With the foregoing in mind, FIG. 1 is a schematic view of a subsea system 10 with a carbon capture system 40 used for capturing carbon (e.g., $CO_2$) from the ocean water to reduce organic growth from occurring on surfaces of underwater equipment. The subsea system 10 located in the underwater location may include electrical cables 12 used for transmitting information and primary electrical power for various subsea components (e.g., actuators, sensors, etc.). The subsea system 10 may also include a subsea hydrocarbon production system configured to extract oil or gas from a subterranean reservoir, a subsea fluid injection system configured to inject fluid (e.g., liquid or gas) into a subterranean reservoir, or any other subsea system associated with subterranean reservoirs. In certain embodiments, the subsea system 10 may include a subsea tree 14 (e.g., tree) coupled to a wellhead 16 to form a subsea station 18 configured to extract and/or inject fluids relative to a subterranean reservoir. For example, the subsea station 18 may be configured to extract formation fluid, such as oil and/or natural gas, from the sea floor 20 through the subterranean well 22. By further example, the subsea station 18 may be configured to inject $CO_2$ into the subterranean reservoir, such as the $CO_2$ captured by the carbon capture system 40. In some embodiments, the subsea system 10 may include multiple subsea stations 18 that extract and/or inject fluids relative to respective subterranean wells 22.

In embodiments of the subsea system 10 configured for production, after passing through the subsea tree 14, the formation fluid flows through fluid conduits or pipes 24 to a pipeline manifold 26. The pipeline manifold 26 may connect to one or more flowlines 28 to enable the formation fluid to flow from the subterranean wells 22 to a surface platform 30. In some embodiments, the surface platform 30 may include a floating production, storage, and offloading unit (FPSO) or a shore-based facility. In addition to flowlines 28 that carry the formation fluid away from the subterranean wells 22, the subsea system 10 may include lines or conduits 32 that supply fluids, as well as carry control and data lines to the subsea equipment. These conduits 32 connect to a distribution module 34, which in turn couples to the subsea stations 18 via supply lines 36. In some scenarios, the surface platform 30 may be located a significant distance (e.g., greater than 100 m, greater than 1 km, greater than 10 km, or greater than 60 km) away from the subterranean wells 22. The subsea system 10 (e.g., the subsea tree 14, the subsea station 18, the pipeline manifold 26, and/or the distribution module 34) may include a subsea power system (e.g., subsea power bus system) that provides secondary power from energy storage units (e.g., batteries, fuel cells, or super capacitors (for initial actuator movement)) over one or more buses to various subsea components (e.g., actuators, sensors, etc.). For example, the subsea power system may be configured to provide secondary power, such as during a power loss from the primary power from the electrical cables 12, to operate various valves, sensors, and other subsea components. While the subsea system described above is for extracting hydrocarbons, it should be understood that the present disclosure may also apply to other types of subsea systems 10 such as subsea injection systems (e.g., subsea gas injection system, subsea water injection system, subsea carbon dioxide injection system).

In some embodiments of the subsea system 10, the carbon capture system 40 may be implemented on surfaces of the underwater equipment of the subsea system 10 including but not limited to the subsea tree 14, the subsea station 18, the pipeline manifold 26, the distribution module 34, valves, blowout preventers (BOPs), pumps, compressors, pipelines, or any combination thereof. As discussed in more detail below, the carbon capture system 40 is positioned on various surfaces of the underwater equipment using an adjustable mount allowing optimization of flow (e.g., ocean current flow, generated flow) of the ocean water flow through a water inlet and a water outlet. Carbon in the ocean water (e.g., carbonic acid, carbonates, dissolved $CO_2$) is adsorbed by the carbon capture system 40 and collected by the ROV (e.g., via a retrievable cartridge, tank, etc.) or processed using fluid handling equipment and/or carbon caption storage. In some embodiments, adsorption and/or desorption of carbon is promoted using energy sources present in the subsea system 10. For example, electricity from the subsea power station and/or thermal energy from the subsea station 18 is used to in some scenarios to generate external flow, heat the carbon capture system 40 during carbon desorption, and/or power bypass flow used in the carbon capture system 40.

Figure 2:
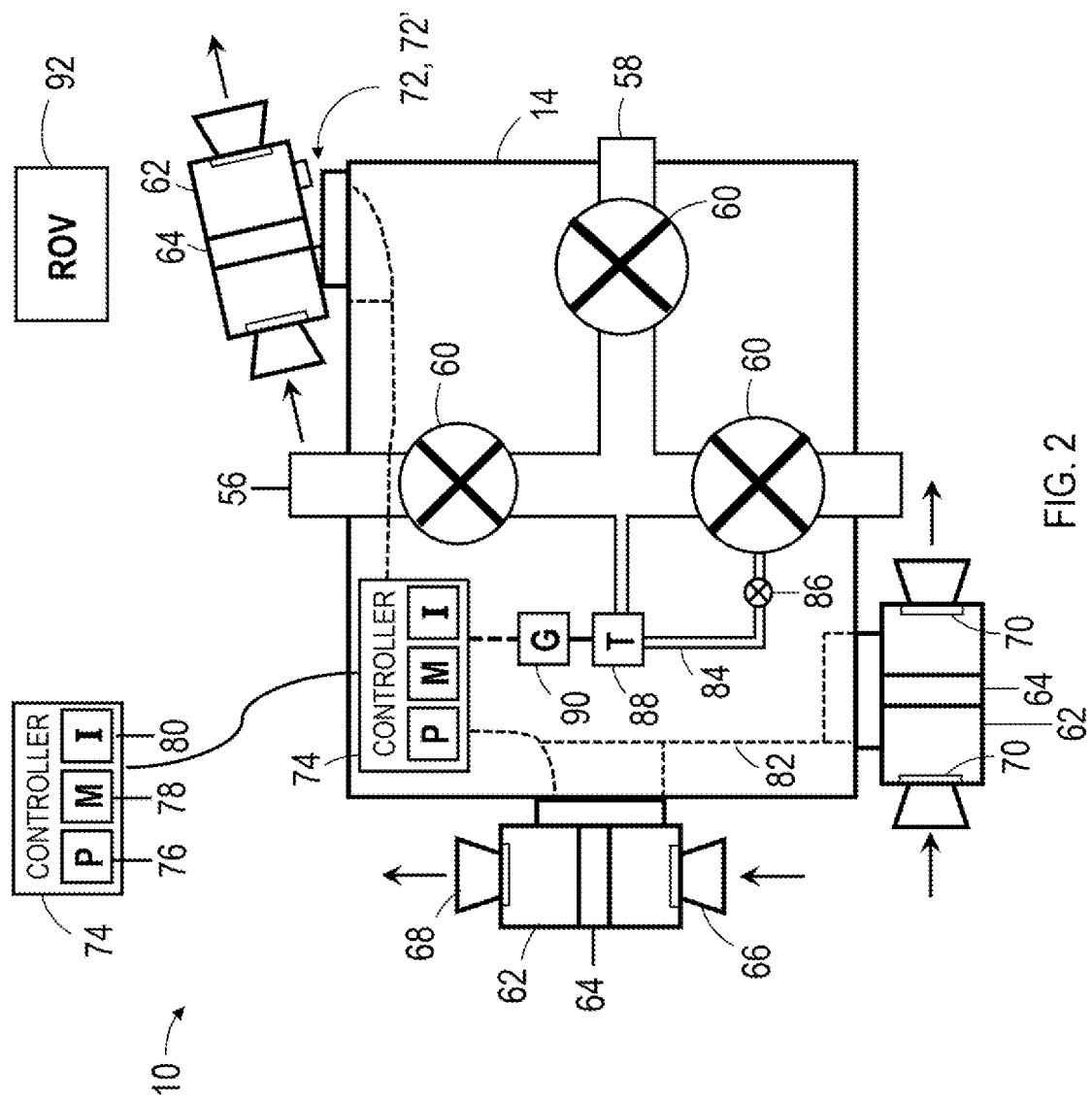
FIG. 2 is a schematic view of the carbon capture system coupled to the subsea system of FIG. 1, according to an embodiment of the present disclosure.

With the foregoing in mind, FIG. 2 is a schematic view of an embodiment of the carbon capture system 40 coupled to the subsea system 10 of FIG. 1. The carbon capture system 40 includes a plurality of carbon capture units 62. In certain embodiments, the carbon capture system 40 may include any number of carbon capture units 62, such as 1, 2, 3, 4, 5, 6, 7, 8, 9, 10, or more associated with the subsea system 10. In this illustrative embodiment, each carbon capture unit 62 is coupled directly to the subsea tree 14 (i.e., mounted to a surface of the subsea tree 14). However, in certain embodiments, one or more carbon capture units 62 may be mounted on the seafloor adjacent the subsea tree 14, on a separate stand adjacent the subsea tree 14, or in any suitable arrangement in close proximately to the subsea tree 14 (e.g., within equal to or les than 1, 2, 3, 4, 5, 6, 7, 8, 9, or 10 meters from the subsea tree 14). In certain embodiments, the carbon capture system 40 may include one or more of the carbon capture units 62 coupled to each subsea component or equipment, including but not limited to the subsea tree 14. Thus, the subsea tree 14 is intended as one non-limited example for application of the carbon capture system 40 to underwater equipment.

The subsea tree 14 includes a vertical flow path 56, a horizontal flow path 58 and various valves 60 that enable the flow of well fluid. The carbon capture unit 62 coupled to the subsea tree 14 includes a carbon capture cartridge 64 with a water inlet 66 and a water outlet 68. The water inlet 66 and water outlet 68 are interchangeable as in the water inlet 66 can serve as the water outlet and the water outlet 68 can serve as the water inlet. A water flow path is controlled by the flow control 70 of the carbon capture unit 62. The carbon capture unit 62 is coupled to the underwater equipment (e.g., subsea tree 14) using adjustable mounts 72 (e.g., variable orientation mount). The carbon capture system 40 includes various controllers 74, wherein the controller 74 may be remote and/or local to the carbon capture system 40. The controller 74 includes a processor 76, a memory 78, and instructions 80 stored on the memory 78 and executable by the processor 76 to control operation of the carbon capture system 40, including controlling flows through each of the carbon capture units 62, controlling operation of the carbon capture units 62 in different operating modes (e.g., adsorption mode, desorption mode, etc.), and controlling the adjustable mounts 72. The carbon capture system 40 may include electrical connections 82 to couple the controller 74 to the carbon capture unit 62. Further, a bypass flow 84 may be generated from the vertical flow path 56 or the horizontal flow path 58 to use energy of the subsea system 10 to power the carbon capture system 40. As such, a valve 86 may be positioned to receive the bypass flow 84 from the subsea system 10 to provide flow to a turbine 88. The turbine 88 is used to power a generator 90 to provide energy for the carbon capture units 62, the controllers 74, and various processes (e.g., carbon capture, fluid handling, and storage) associated with the carbon capture system 40.

In some embodiments, a remote operating vehicle (ROV) 92 is used to provide service to the carbon capture system 40. The ROV 92 may be used to mount, remove, or service the carbon capture unit 62 on the subsea system 10 by coupling the carbon capture unit 62 to the adjustable mounts 72. The adjustable mounts 72 of the carbon capture unit 62 may be coupled to the subsea system 10 using various couplings (e.g., fasteners, bolts, screws, joints, magnets, and the like). In some embodiments, the adjustable mounts 72 may be included in initial design and assembly of the subsea system 10. The adjustable mounts 72 may also be added or removed at any point after the subsea system 10 is established. In the illustrative embodiment, the adjustable mounts 72 are attached on the subsea tree 14 to optimize the flow of water, as illustrated in FIG. 2. For example, the adjustable mount 72, 72' schematically demonstrates the ability to adjust an orientation of the carbon capture unit 62. The orientation of the carbon capture unit 62 may optimize the flow of water (e.g., passive and/or active) moving from the water inlet 66 to the water outlet 68. As such, the carbon capture unit 62 may be included on the subsea system 10 in various configurations. For example, using the adjustable mounts 72, the carbon capture unit 62 may be arranged in a vertical orientation, a horizontal orientation, or any angular orientation ranging between the vertical and horizontal orientations with respect to the subsea tree 14 of the illustrated embodiment. For example, the adjustable mounts 72 may be configured to change an angular position of the carbon capture units 62 relative to the surface of the subsea tree 14, and may vary between 0 to 180 degrees, 0 to 90 degrees, 0 to 45 degrees, or any other suitable range relative to a horizontal axis, a vertical axis, or both. In some embodiments, the controller 74 may automatically adjust the orientation of the carbon capture units 62 via the adjustable mounts 72 (e.g., motorized mounts) in response to changes in environmental conditions (e.g., current directions, temperatures, etc.), user input, a schedule, or any combination thereof. In some embodiments, the adjustable mounts 72 are connected using couplings attached to the carbon capture unit 62 and any suitable component of the underwater equipment. For example, the adjustable mounts 72 are disposed on the surface of the wellhead 16 or the pipeline manifold 26 to allow the carbon capture unit 62 to collect carbon at various zones of the subsea system 10.

In certain embodiments, the carbon capture system 40 captures carbon by passive flow of water moving from the water inlet 66 to the water outlet 68 of the carbon capture unit 62. As water passively flows through the carbon capture unit 62, carbon is adsorbed by a sorbent material of the carbon capture cartridge 64. The carbon capture cartridge 64 may include walls, screens, mesh that allow the flow of water through the sorbent material to collect carbon. For example, the carbon capture cartridge 64 may be selected to ensure the flow of water is directed through the sorbent material with consistent pressure. As the carbon capture cartridge 64 reaches a saturation level (e.g., carbon loading amount, percentage of use, threshold amount of time), the sorbent material contained within the carbon capture cartridge 64 may require replacement. As such, the carbon capture cartridge 64 itself as well as the sorbent material are exchangeable and/or removable by the ROV 92. In some instances, the carbon capture cartridge 64 is replaced with a second carbon capture cartridge to allow continued carbon capture. For example, the carbon capture cartridge 64 may be installed in the carbon capture unit 62 for a threshold period of time (e.g., 3 months, 6 months, 1 year) and require replacement. The ROV 92 removes the carbon capture cartridge from the carbon capture unit 62 and replaces it with the second carbon capture cartridge. The second carbon capture cartridge may include the sorbent material with similar lifecycles (e.g., threshold period of time) or may be made of alternative materials that can be used for a time greater or less than the threshold period of time. In some embodiments, the sorbent material may be replaced by the ROV 92 with the carbon capture cartridge 64 remaining in the carbon capture unit 62. Further, the carbon capture cartridge 64 and the sorbent material may be reusable. The carbon capture cartridge 64 may then be processed at another location, such as at the surface, to desorb the carbon from the sorbent material and store the captured carbon in a storage unit (e.g., tank). For example, the carbon capture cartridge 64 may include the sorbent material that adsorb and desorbs carbon based on a temperature swing adsorption process, wherein a relatively lower temperature facilitates the adsorption of carbon (e.g., $CO_2$) into the sorbent material, and a relatively higher temperature (e.g., provided by a heat source) facilitates the desorption of carbon from the sorbent material for carbon capture and storage. However, the carbon capture cartridge 64 may include any suitable carbon capture media and techniques for capturing carbon from the water.

With the foregoing in mind, in some embodiments, the carbon capture system 40 may include the controllers 74 that may operate independently and/or in combination with one another to facilitate control of the carbon capture system 40 and operation of the subsea components. For example, the instructions 80, when executed by the processor 76, enable the controller 74 to control the carbon capture system 40 to selectively operate at least one of the carbon capture units 62 in a first operational mode to adsorb carbon from the ocean water through the generation of the bypass flow 84. In certain embodiments, the instructions 80, when executed by the processor 76, may enable the controller 74 to control the carbon capture system 40 to selectively control at least one of the carbon capture units 62 in a second operation mode to desorb carbon captured from the ocean water using the carbon capture cartridge 64.

In some embodiments, the bypass flow 84 is generated by directing fluid from the vertical flow path 56 or the horizontal flow path 58 of the subsea tree 14 through the valve 86 to the turbine 88 and the generator 90 to generate electrical energy. The energy generated from the bypass flow 84 of the subsea system powers the controller 74 to control components of the carbon capture system 40 via the electrical connections 82. For example, the flow control 70 is controlled by the controller 74 to control the water flow through the carbon capture unit 62. The flow control 70 may include a pump, a motor, a door or flap, louvers, a valve, or other suitable components to control the flow direction and flowrate of the ocean water. For example, the pump may be an electric motor driven pump powered by the generator 90, wherein the controller 74 can adjust the speed of the pump to change the flow rate and adjust the rotational direction of the pump to change the flow direction. By further example, the controller 74 can control an electric motor to drive the door, flap, louvers, or valve between open and closed positions to either enable, disable, or vary the flow rate through the carbon capture unit 62. In some instances, the flow control 70 may disable the flow of the water along the water flow and define a closed volume with a housing of the carbon capture unit 62, such as for isolating the sorbent material within the carbon capture unit 62. Further, the flow control 70 may enhance or promote flow of the ocean water into the carbon capture unit 62. For example, the flow control 70 may include the pump positioned at the water inlet 66 or the water outlet 68 that respectively pulls or expels the ocean water through the carbon capture cartridge 64 of the carbon capture unit 62.

Figure 3:
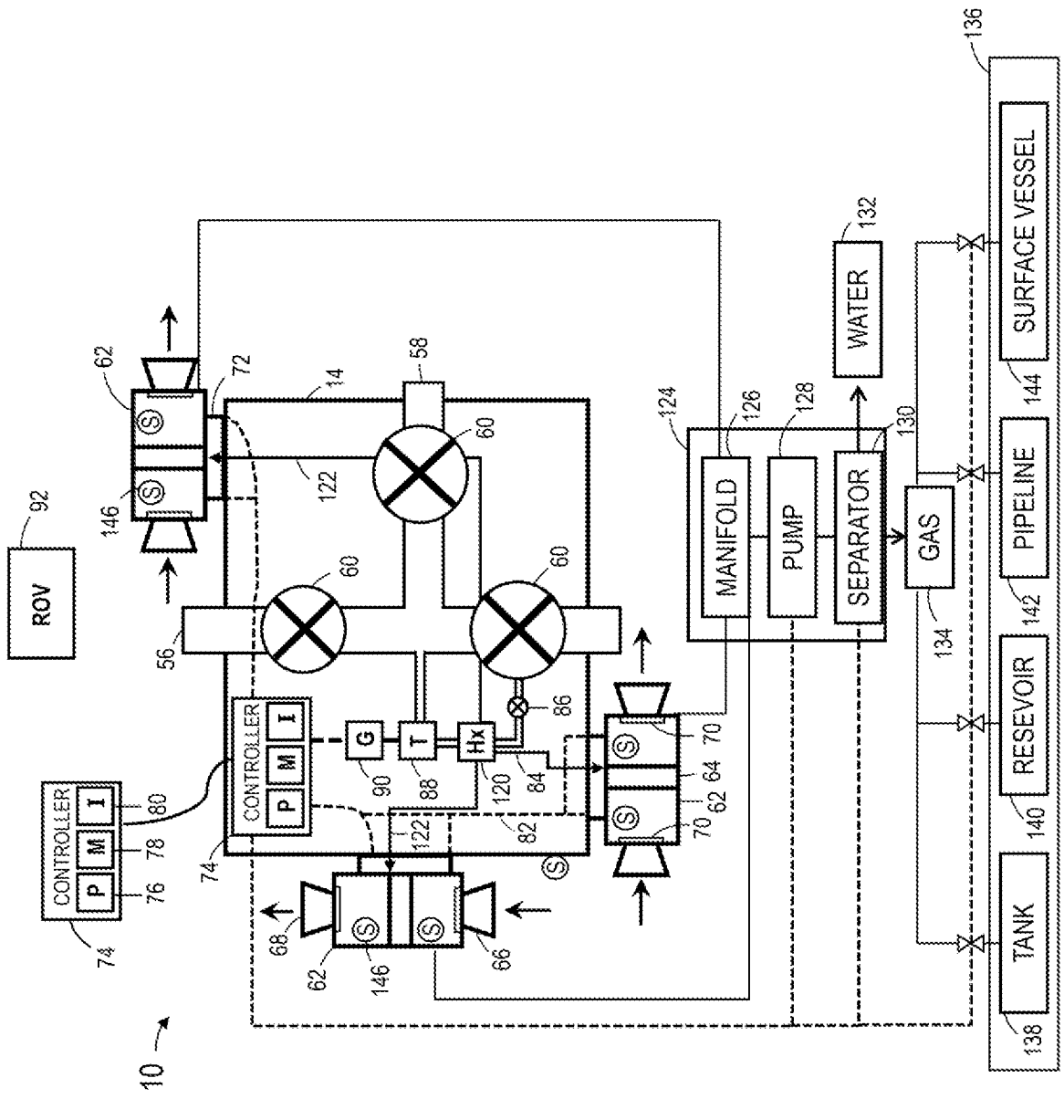
FIG. 3 is a schematic view of the carbon capture system coupled to the subsea system of FIG. 1, further illustrating fluid handling equipment and carbon capture storage, according to an embodiment of the present disclosure.

FIG. 3 is a schematic view of the subsea system 10 coupled with the carbon capture system 40 including fluid handling equipment and carbon capture storage. In this illustrative embodiment, the carbon capture unit 62 is coupled to the subsea tree 14 in the underwater location. The bypass flow 84 includes a heat exchanger 120 with heat exchanger connections 122 (e.g., fluid conduits) to the carbon capture unit 62. The heat exchanger 120 may include an indirect heat exchanger, such as a shell and tube heat exchanger, a coiled tube heat exchanger, a plate heat exchanger, a double tube heat exchanger, or any combination thereof. The carbon capture system 40 includes fluid handling equipment 124. The fluid handling equipment 124 includes a manifold 126, a pump 128, a separator 130, or a combination thereof. The manifold 126 may include one or more fluid inlets coupled to the various carbon capture units 62 and one or more fluid outlets coupled to carbon capture storage 136, thereby helping to collect and distribute any carbon capture fluids from the carbon capture units 62 to the carbon capture storage 136. The separator 130 can separate the carbon capture fluids from the carbon capture units 62 into a water stream 132 and a gas stream 134 (e.g., carbon-containing gas or $CO_2$). The separator 130 may include a gas liquid separator, such as a centrifugal separator, a gravity separator, or any combination thereof. For example, as an output from the separator 130, the gas stream 134 may include carbon dioxide ($CO_2$) that is directed to carbon capture storage 136. The carbon capture storage 136 includes one or more of a tank 138, a reservoir 140 (e.g., a subterranean reservoir), a pipeline 142, a surface vessel 144, or a combination thereof. Further, the carbon capture system 40 can include a variety of sensor(s) 146.

In certain embodiments, the carbon capture system 40 receives a water flow along a water flow path between the water inlet 66 and the water outlet 68, and adsorbs carbon in the carbon capture cartridge 64 in the first operational mode (e.g., adsorption mode). The controller 74 may provide an indication (e.g., based on a threshold time, the saturation level, or the like) that the carbon capture unit 62 may need replacement or active removal of carbon before additional carbon is adsorbed. In some embodiments, the carbon capture cartridge 64 may be replaced by the ROV 92. In certain embodiments, it may be advantageous to incorporate active control of the carbon capture cartridge 64 saturation level without replacement. As such, the carbon capture system 40 may be controlled by the controller 74 to operate in a second operational mode (e.g., desorption mode) to desorb carbon from the carbon capture cartridge 64. For example, the controller 74 may control the flow control 70 on the water inlet 66 and water outlet 68 of the carbon capture unit 62 to stop flow of the ocean water to allow desorption of carbon to occur. Further, the carbon capture unit 62 is controlled to desorb carbon from the carbon capture cartridge 64 to produce the carbon capture fluids directed to the fluid handling equipment 124. As noted above, the carbon capture cartridge 64 may include sorbent material configured to alternatingly adsorb carbon (e.g., $CO_2$) and desorb carbon based on a temperature swing adsorption process, wherein a relatively lower temperature (e.g., temperature of seawater) facilitates the adsorption of carbon (e.g., $CO_2$) into the sorbent material, and a relatively higher temperature (e.g., provided by a heat source such as waste heat from the heat exchanger 120) facilitates the desorption of carbon from the sorbent material for carbon capture and storage.

With the foregoing in mind, in some embodiments, the heat exchanger 120 is used in various methods (e.g., waste heat recovery from the subsea system 10). For example, hot fluid (e.g., production fluid) from the subsea tree 14 may be circulated through the heat exchanger 120 that may transfer heat (e.g., geothermal) to the carbon capture system 40, thereby transferring heat to the sorbent material in the carbon capture cartridge 64 during the desorption mode. In certain embodiments, the heat exchanger 120 is configured to transfer heat from the hot fluid flowing through the bypass flow 84 to water (e.g., seawater) circulating through the carbon capture unit 62 while the flow controls 70 are closed, thereby heating the water in the carbon capture unit 62 and desorbing the carbon into the water to generate the carbon capture fluid for delivery to the fluid handling equipment 124. In certain embodiments, the heat exchanger 120 is configured to transfer heat from the hot fluid flowing through the bypass flow 84 to another thermal fluid that circulates through tubing in the carbon capture unit 62. Heat that is transferred from the heat exchanger 120 is used to facilitate desorption of carbon (e.g., $CO_2$) from the carbon capture cartridge 64, such that the carbon capture fluid can then be routed to the fluid handling equipment 124 in the second operational mode (e.g., desorption mode). In some instances, heat from the heat exchanger 120 may induce a change in temperature within the carbon capture unit 62 above an ambient temperature (e.g., a temperature increase of equal to or greater than 20, 30, 40, 50, 60, 70, 80, 90, or 100° C.) of the water flow path, such that the temperature increase causes the carbon (CO2) to desorb from the sorbent material in the carbon capture cartridge 64 during the desorption mode. In this manner, the carbon capture fluid is generated such that the carbon capture cartridge 64 of the carbon capture unit 62 is reusable and is controlled by the controller 74 to operate in the adsorption mode to capture carbon as the water flow to the carbon capture unit 62 is restored.

In some embodiments, the fluid handling equipment 124 processes the carbon capture fluid that is generated from the desorption mode of the carbon capture cartridge 64. The fluid handling equipment 124 produces the water stream 132 and the gas stream 134 (e.g., the carbon) by processing the carbon capture fluid using a combination of the manifold 126, the pump 128 and/or the separator 130. For example, the carbon capture fluid from one or more of the carbon capture units 62 is directed to the manifold 126. The manifold 126 receives the fluid output from multiple sources and the pump 128 distributes the fluid output for further processing. In this manner, the fluid output is directed to the separator 130 that is used to separate the carbon from the fluid output that may contain water. In some instances, the separator 130 may be configured to separate other fluids, particulate, and/or impurities, such as particles, algae, oxygen and sulfates. Accordingly, the separator 130 reduces these impurities to an acceptable level prior to storage of the gas stream 134. In certain embodiments, carbon may be present in the fluid output in the form of carbonates, bicarbonates, carbonic acid, and/or dissolved $CO_2$ (e.g., gaseous $CO_2$). As such, in the illustrated embodiment, the separator 130 may include processes to promote the decomposition of carbonates to produce gaseous $CO_2$ (e.g., acidification, electrodeionization, dissociation). As such, the gas stream 134 (e.g., gaseous $CO_2$) produced by the fluid handling equipment 124 is directed to the carbon capture storage 136.

In certain embodiments, the carbon capture storage 136 is used to provide suitable storage for the gas stream 134 produced by the fluid handling equipment 124. In the illustrated embodiment, the carbon capture storage 136 includes the tank 138, the reservoir 140, the pipeline 142 and the surface vessel 144. It should be noted that any suitable combination of carbon capture storage variations may be used to provide long or short term storage solutions to the gas stream 134 produced by the carbon capture system 40. In some embodiments, the gas stream 134 is stored in the tank 138. The tank 138 may be positioned on the sea floor 20 in the underwater location or in any suitable arrangement with respect to the underwater equipment. For example, the tank 138 may be positioned such that it is retrievable (e.g., by the ROV) after receiving a threshold amount of the gas stream 134. In some embodiments, the tank 138 may remain positioned on or near the sea floor 20 along the underwater equipment of the subsea system 10 for long-term storage of $CO_2$.

In certain embodiments, the reservoir 140 receives the gas stream 134 through a conduit and injects the gas stream 134 into the reservoir 140 of the subsea system 10. For example, the gas stream 134 may be directed to the reservoir 140 associated with the subsea tree 14 on which the carbon capture system 40 is coupled or another separate reservoir 140. For example, in some embodiments, it may be advantageous to the direct the gas stream 134 to the reservoir 140 associated with additional subsea stations 18 not directly coupled to the carbon capture system 40. As such, the gas stream (e.g., containing $CO_2$) may be injected in the reservoir 140 (e.g., mineral reservoir, subterranean or subsea geologic formations) in which carbon can be stored or sequestered. For example, injection of the gas stream 134 may increase extraction levels of oil as $CO_2$ is soluble with light hydrocarbons and may displace light hydrocarbons within reservoirs. In another example, storage of carbon in a depleted reservoir 140 may be advantageous to make use of de-commissioned offshore facilities.

In some embodiments, the gas stream 134 is directed to the pipeline 142 to transfer the gas stream 134 to an off-site or remote location. The pipeline 142 may direct the gas stream 134 (e.g., the carbon) via conduits to systems that use and/or process $CO_2$. For example, the pipeline 142 may be accessed for injection into various subterranean wells 22 when appropriate. In some instances, water alternating gas (WAG) or other processes using $CO_2$ may be used to enhance oil recovery and increase sweep efficiency. Therefore, in some instances, the carbon capture system 40 may provide the gas stream 134 to the pipeline 142 for subsequent use in oil recovery operations. In certain embodiments, the pipeline 142 (e.g., preexisting, included in the underwater equipment) may serve as temporary storage (e.g., in transit storage) of the gas stream 134 produced from the carbon capture system 40. In some instances, the gas stream 134 may be stored in combination between the tank 138, reservoir 140, the pipeline 142, and the surface vessel 144. In this manner, the gas stream 134 may be stored in a variety of the carbon capture storage 136 as the carbon capture system 40 continues to capture carbon from the underwater environment. In certain embodiments, the gas stream 134 is directed to the surface vessel 144 for storage of the carbon captured from the carbon capture system 40. The surface vessel 144 may include a surface tank (e.g., tank on surface platform, tank on ship). For example, the gas stream 134 may be advantageously used in processes in which carbon is required (e.g., ethanol production, electrolysis, enhanced oil recovery).

In some embodiments, the fluid handling equipment 124 may generate a carbon output to be directed to the carbon capture storage 136 that contains liquified $CO_2$ or solid carbon containing products (e.g., precipitated calcium carbonate, precipitated magnesium carbonate). The subsea system 10 may exist within various depths (e.g., ocean depths) leading to variation in surrounding pressure. It should be noted, as carbon exists as a gas, liquid, supercritical fluid, solid, or solid hydrate under different pressures (e.g., present at different subsea depths), it may be advantageous to store carbon in different states of matter. In this manner, the carbon capture storage 136 may be assembled to store the carbon output through carbon hydrate solidification, carbon solidification, carbon mineralization, carbon liquification, gaseous $CO_2$, or a combination of the like. For example, mineralized carbon (e.g., carbon carbonate, magnesium carbonate) is stored in the reservoir 140 through structural trapping, residual trapping, solubility trapping and/or mineral trapping generating stable carbonate compounds for long-term storage in deep geological formations.

In certain embodiments, the controller 74 includes an electronic controller having electrical circuitry configured to process data from sensor(s) 146 (e.g., temperature sensor, pressure sensor, flow sensor, carbon saturation sensor, etc.). The controller 74 may be configured to control the flow control 70 of the carbon capture unit 62 to adjust the water flow through the flow path of the carbon capture cartridge 64. For example, the controller 74 may be configured to control a pump of the flow control 70 (e.g., within the carbon capture unit 62) to adjust the flow of the water through the water inlet 66 and/or the water outlet 68. For example, an increase in pressure of the water inside the carbon capture unit 62 increases a flow rate of the water through the carbon capture cartridge 64 and expelling out the water outlet 68, so as to maintain a desired pressure (e.g., range) at the sensor(s) 146, for example. In some embodiments, the controller 74 may additionally or alternatively instruct other operations of the flow control 70, such as to increase the flow rate, or control one or more actuators to adjust one or more valves or doors of the flow control 70 to define the closed volume of the carbon capture unit 62. As such, the closed volume created through the actuation of the valves or doors of the flow control 70 is used to disable the water flow path during the desorption mode.

As illustrated, the carbon capture system 40 includes one or more controllers 74 that communicate with and/or control the sensor(s) 146. The sensor(s) 146 may include flow meters, flow control device (e.g., choke), pressure meters, saturation meters (e.g., carbon saturation level detector). During operation, the controller 74 may receive feedback from the sensor(s) 146, such as one or more pressure sensors, one or more temperature sensors, one or more conductivity probes (e.g., conductivity sensors), and/or one or more optical sensors. In some embodiments, the pressure sensor and the temperature sensor may be combined (e.g., a pressure and temperature transmitter (PTTx)). Additionally, the controller 74 may receive feedback from the various flow meters (e.g., wet-gas flow meter, multi-phase flow meter). The controller 74 may be operatively coupled to sensor(s) 146 and the flow meters via any suitable communication link, such as, for example, RS-422, RS-435, RS-485, Ethernet, controller area network (CAN) (e.g., CAN bus, CANopen), optical fibers, and/or wireless communication.

In some embodiments, sensor(s) 146 on surfaces of the underwater equipment or carbon capture system 40 are used to monitor at least one parameter indicative of biological growth (e.g., flow rate, temperature, pH, salinity) or conditions conducive to biological growth (e.g., acidification, carbonate composition, calcification, chemical composition of the water) in the water. As such, the at least one parameter is compared to a threshold (e.g., threshold flow rate, threshold temperature, threshold pH, threshold salinity) to obtain a comparison of the biological growth (or potential for biological growth) on the underwater equipment. The controller 74 can control operation of the carbon capture system 40 based on the comparison of the at least one parameter measured by the sensor(s) 146 against the threshold. For example, the controller 74 may selectively adjust the adjustable mount 72 and orientation of the carbon capture unit 62, adjust the flow controls 70 (e.g., pump, valve, etc.), or any combination thereof, depending on the comparison. If the comparison indicates a higher or increasing risk of biologic growth, then the controller 74 may selectively engage or increase a speed of a pump of the flow control 70, vary an orientation of the carbon capture unit 62, or a combination thereof. Likewise, if the comparison indicates a lower or decreasing risk of biological growth, then the controller 74 may selectively disengage or decrease a speed of the pump of the flow control 70. In certain embodiments, the sensor(s) 146 are used to monitor the pH of the water near the surface of the subsea tree 14. The sensor(s) 146 monitor the pH and the controller 74 receives sensor data indicative of pH of the water. The controller 74 compares the pH to the threshold pH (e.g., ranging from 6.5 to 8) that may be indicative of conditions conducive to biological growth, such as acidification levels of the water surrounding the subsea tree 14. As such, pH is compared to the threshold pH known to promote the biological growth and analyze efficiency (e.g., difference between pH of the water of the subsea tree 14 and the threshold pH) of the carbon capture system 40.

Figure 4:
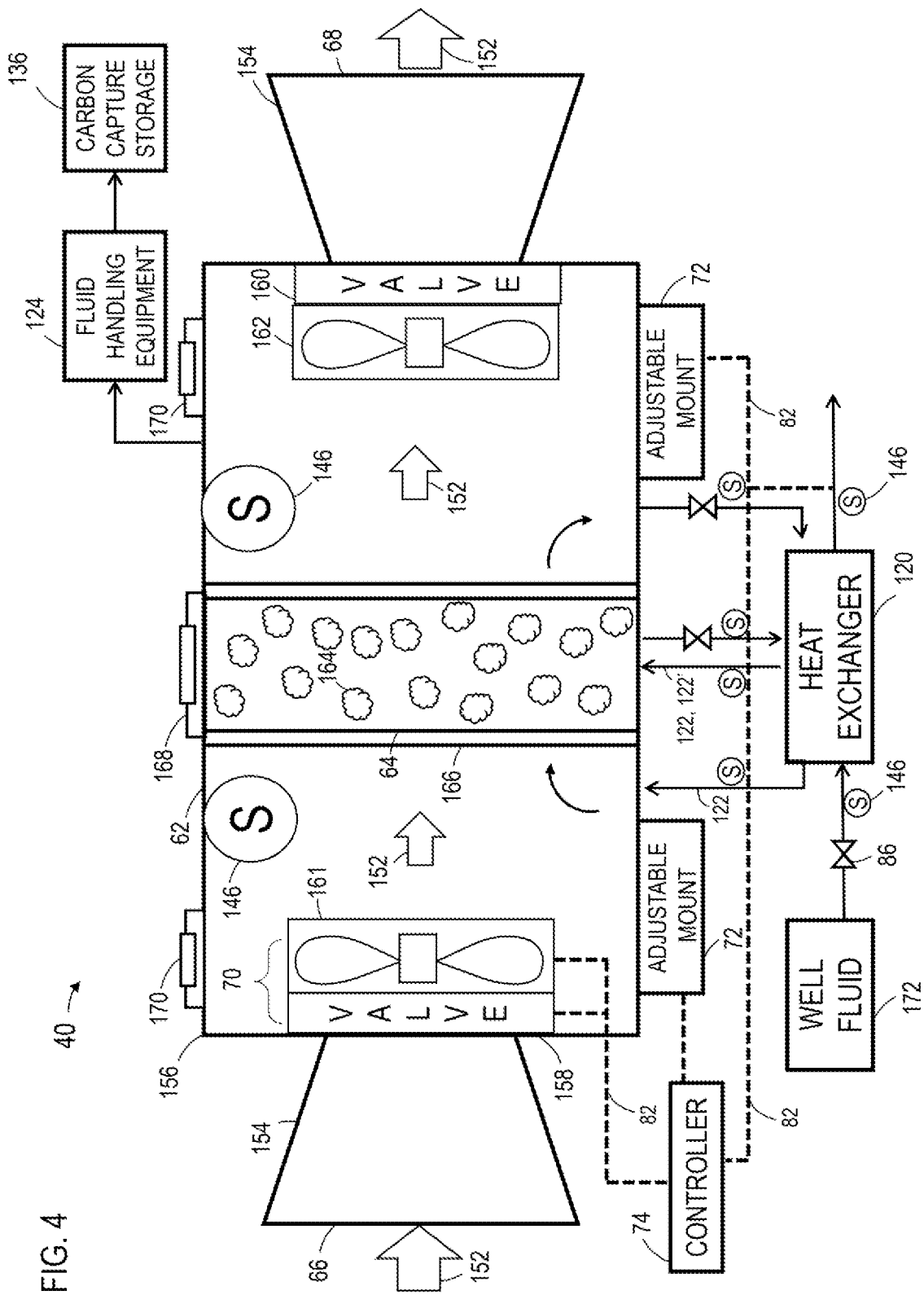
FIG. 4 is a schematic view of a carbon capture unit of the carbon capture system of FIG. 2, according to an embodiment of the present disclosure.

FIG. 4 is a schematic view of an embodiment of the carbon capture system 40 of FIG. 3. The carbon capture system 40 includes the carbon capture unit 62, the fluid handling equipment 124, and the carbon capture storage 136. In some embodiments, the carbon capture unit 62 and the adjustable mount 72 (e.g., motorized mount) are controlled by the controller 74 by way of electrical connections 82. Further, the carbon capture unit 62 is coupled to the heat exchanger 120 in various configurations by way of the heat exchanger connection 122 and 122'. The heat exchanger 120 transfers heat from the well fluid 172 of the subsea tree 14 by way of valve 86 from the bypass flow 84 as described above with reference to FIG. 2. In the illustrated embodiment, the carbon capture unit 62 includes the water flow path 152 that flows through the ports 154 (e.g., inlet port, outlet port) positioned at the water inlet 66 and the water outlet 68. The carbon capture unit 62 also includes a housing 156, and the flow control 70 having a valve 158, a valve 160, a pump 161, and a pump 162 positioned at opposite ends of the housing 156 at the ports 154 (e.g., the water inlet 66 and the water outlet 68). The carbon capture cartridge 64 of the carbon capture unit 62 includes a sorbent material 164 (e.g., solid sorbents, ceramic materials, membranes, organic materials, etc.) and a carbon capture cartridge receptacle 166. The carbon capture system 40 also includes a first ROV coupling 168 attached to the carbon capture unit 62 and a second ROV coupling 170 attached to the housing 156 to enable the ROV 92 to install and remove the carbon capture cartridge 64 relative to the housing 156 and/or to install and remove the carbon capture unit 62 relative to the subsea tree 14. In some embodiments, the sensor(s) 146 are positioned within the carbon capture unit 62 (e.g., within the housing 156 between at or between the ports 154) to provide feedback to the controller 74.

The carbon capture system 40 includes the carbon capture unit 62 that promotes flow of water through the carbon capture cartridge 64 in the first operational mode (e.g., adsorption mode). In the illustrated embodiment, arrows are used to indicate approximate flow directions of the water flow path 152. The water flow path 152 proceeds from the water inlet 66 through the port 154 and the flow control 70. The port 154 may have a cone-shaped wall to promote flow of the water into the carbon capture system 40. In some embodiments, the port 154 may have any suitable shape (e.g., annular wall, curved annular wall, etc.) to promote flow of the water. After flowing through the port 154, the water flow path 152 moves through the flow control 70. The flow control 70 positioned at the water inlet 66 includes the valve 158 and the pump 161 that are used to control (e.g., open, close, or vary) the flow rate of the water into the carbon capture unit 62 in the adsorption mode. Similarly, the flow control 70 positioned at the water outlet 68 includes the valve 160 and the pump 162 that are used to control (e.g., open, close, or vary) the flow rate of the water out of the carbon capture unit 62 in the adsorption mode. For example, the sensor(s) 146 positioned along the water flow path 152 may indicate to the controller 74 to increase the flow rate by actuating the pump 161 and/or 162. In this manner, it may be may advantageous to increase the flow rate to reduce buildup of organic growth as induced flow can inhibit biological growth through prevention of organic buildup.

In certain embodiments, the water flow path 152 proceeds through the carbon capture cartridge 64 and the sorbent material 164 enabling carbon capture. The carbon capture cartridge 64 positioned within the cartridge receptacle 166 provides the water flow path 152 access to the sorbent material 164 used to adsorb the carbon from the water. The sorbent material 164 may be selected to have high surface area to volume ratios to enable carbon capture within pore structures. For example, the sorbent material 164 selected for use in the carbon capture system 40 may include organic, inorganic, metal organic frameworks, and/or hybrid adsorbents to capture carbon from the water flow path 152. In this manner, in some embodiments, physical adsorbents such as activated carbon or zeolite containing materials may be used as the sorbent material 164 to offer porous surface areas for carbon removal within the carbon capture unit 62.

With this in mind, the sensor(s) 146 are used to monitor changes in carbon content (e.g., $CO_2$ content) of the water flow path 152 as it passes through the carbon capture cartridge 64, such as upstream and downstream of the carbon capture cartridge 64 having the sorbent material 164. The sensor(s) 146 may analyze the threshold percentage of change in carbon content (e.g., 0.5%, 1%, 5%, 10%) of the water by comparing data from the sensor(s) positioned before and after the carbon capture cartridge 64 along the water flow path 152. For example, if the threshold percentage of change in carbon content is less than 10%, then the controller 74 may initiate the second operational mode (e.g., desorption mode) to remove carbon from the sorbent material 164 of the carbon capture cartridge 64. As such, the water flow path 152 expelled through the pump 162 and the valve 160 positioned at the water outlet 68 during the first operational mode (e.g., adsorption mode) may be modulated to disable the water flow path 152.

In some embodiments, the water flow path 152 is disabled in the second operational mode (e.g., desorption mode) via deactivation of the pumps 161 and 162 and actuation of the valve 158 and the valve 160 to move from open positions to closed positions to define the closed volume within the housing 156 of the carbon capture unit 62. For example, the closed volume is achieved as the valve 158 (e.g., first door) and the valve 160 (e.g., second door) seal the housing 156 stopping the flow of water. In certain embodiments, the desorption mode includes the use of the heat exchanger 120. The heat exchanger 120 is used to transfer heat (e.g., waste heat) from the bypass flow 84 to the carbon capture system 40 via the heat exchanger connection 122. In certain embodiments, the heat exchanger connection 122 may include fluid conduits, thermally conductive connections, heat pipes, or any combination thereof. In the illustrated embodiment, the heat exchanger connection 122 includes fluid conduits coupled to an interior of the housing 156 in fluid communication with the water within the housing 156, such that the water circulates through the heater exchanger 120 and exchanges heat with the well fluid 172 separately flowing through the heat exchanger 120. In this manner, the heat transferred from the heat exchanger 120 is used to generate a heated water source, which is cycled through the closed volume of the housing 156 of the carbon capture unit 62 to thermally induce the desorption of carbon (e.g., $CO_2$) from the sorbent material 164 in the carbon capture cartridge 64. As such, the carbon within the sorbent material 164 desorbs into the water within the housing 156 of the carbon capture unit 62, thereby resulting in the carbon capture fluid (e.g., water with desorbed carbon). The carbon capture fluid produced from the carbon desorption is directed to the fluid handling equipment 124 and carbon capture storage 136.

In some embodiments, it may be advantageous to use the heated water source from the heat exchanger 120 to directly heat the carbon capture cartridge 64 and sorbent material 164. As such, the heat exchanger connection 122' may direct the heated water source to the carbon capture cartridge 64 and provide water at increased temperature directly to the sorbent material 164. In this manner, the carbon is desorbed from the sorbent material 164 allowing the fluid output of the carbon capture system 40 to be further processed. The use of the heated water source generated from the heat exchanger 120 allows the sorbent material to be reused as the controller 74 enables the first operational mode (e.g., adsorption mode). In certain embodiments, multiple cycles of the carbon capture system 40 are performed to remove carbon from the water surrounding the underwater equipment.

With the foregoing in mind, in some embodiments, the carbon capture system 40 may benefit from replacement of the carbon capture unit 62 or components of the carbon capture unit 62. For example, after some threshold iterations of the adsorption mode and the desorption mode, the carbon capture cartridge 64 and/or the sorbent material 164 may need replacement to ensure proper carbon capture. In this manner, the carbon capture cartridge 64 is fitted with the first ROV coupling 168. The first ROV coupling 168 allows the carbon capture cartridge 64 in its entirety or the sorbent material 164 to be accessed by the ROV 92. The ROV 92 may be controlled to remove and replace the carbon capture cartridge 64 as is found suitable. In certain embodiments, the carbon capture unit 62 may require replacement or retrieval by the ROV 92. As such, the carbon capture unit 62 is fitted with the second ROV coupling 170 to allow ease of access for service, retrieval, and replacement.

Figure 5:
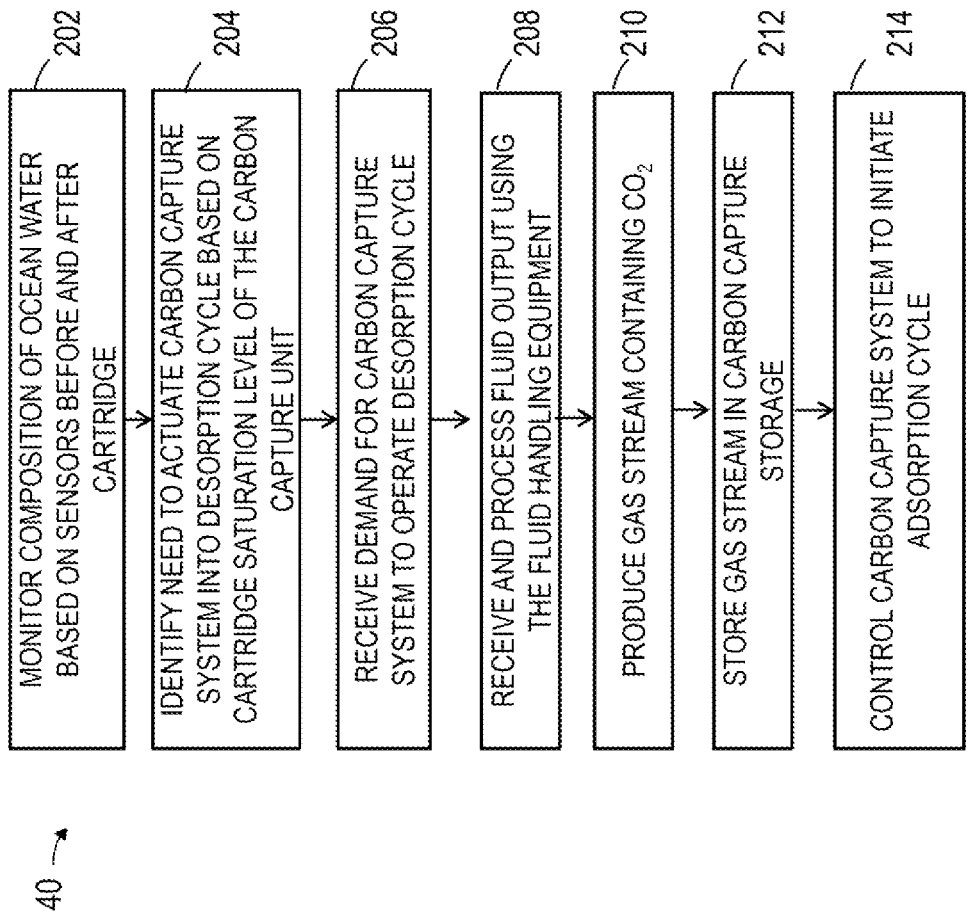
FIG. 5 is a flowchart of an example process for initiation of a desorption mode of the carbon capture system of FIG. 3, according to an embodiment of the present disclosure.

FIG. 5 is a flowchart of an embodiment of a process for initiation of a desorption mode of the carbon capture system 40 of FIG. 3. At block 202, the controller 74 monitors the composition of the ocean water upstream and downstream of the cartridge 64 based on sensor(s) 146 positioned in the housing 156 upstream and downstream of the cartridge 64 within the carbon capture unit 62. At block 204, the controller 74 identifies the need for actuation of the carbon capture system 40 into the second operational mode (e.g., desorption mode) to desorb carbon based on the cartridge saturation level of the cartridge 64 of the carbon capture unit 62. Further, at block 206, the controller 74 receives a demand from the carbon capture system 40 to operate the desorption mode. At block 208, the fluid handling equipment 124 receives the fluid output from the carbon capture unit 62 and processes the fluid output to produce the water stream 132 and the gas stream 134. At block 212, the carbon capture storage 136 receives and stores the gas stream 134. At block 214, the controller 74 controls the carbon capture system 40 to initiate the first operational mode (e.g., adsorption mode).

In some embodiments, the controller 74 monitors the composition of the ocean water upstream and downstream of the cartridge 64 based on sensor(s) 146 and determines based on a threshold percentage of change in carbon content (e.g., 0.5%, 1%, 5%, 10%) or the carbon saturation level (e.g., 80%, 90%, 95%) that the carbon capture cartridge 64 is no longer capturing a substantial amount of carbon from the ocean water. As such, the controller 74 identifies the need for actuation of the carbon capture system 40 into the desorption mode. The desorption mode may be initiated by the controller 74 actuating the flow control 70 to isolate the carbon capture unit 62 (e.g., deactivate pumps 161 and 162 and close the valves 158 and 160), so that the ocean water is no longer flowing through the housing 156 having the carbon capture cartridge 64. Once the housing 156 is closed relative to the surrounding water (e.g., valves 158 and 160 closed), the heated fluid from the heat exchanger 120 is used to selectively heat the cartridge 64 to increase temperature above a threshold temperature for desorption of the carbon into the water within the housing 156. The threshold temperature may depend on the particular sorbent material used in the carbon capture cartridge 64 and the anticipated heat available in the heat exchanger 120. For example, the threshold temperature may be at least equal to or greater than 20, 30, 40, 50, 60, 70, 80, 90, or 100° C. above the ambient temperature of the surrounding water.

Further, after generation of the fluid output (e.g., carbon capture fluid having the carbon desorbed into the water contained in the housing 156), the fluid handling equipment 124 receives the fluid output. For example, the fluid handling equipment 124 may direct the fluid output from multiple carbon capture units 62 undergoing the desorption mode to the manifold 126 to generate a singular flow of fluid output. The pump 128 may then direct the fluid output to the separator 130 where the gas stream 134 (e.g., containing $CO_2$) is generated. In this manner, the gas stream 134 is directed to the carbon capture storage 136. For example, the gas stream 134 may be directly injected into the reservoir 140 for long term storage. The controller 74 may then control the carbon capture system 40 to initiate the adsorption mode and continue to capture carbon from the flow of the ocean water within the carbon capture unit 62. In this way, the carbon capture system 40 is able to adsorb carbon and prevent buildup of organic growth on the surface of the underwater equipment.

Figure 6:
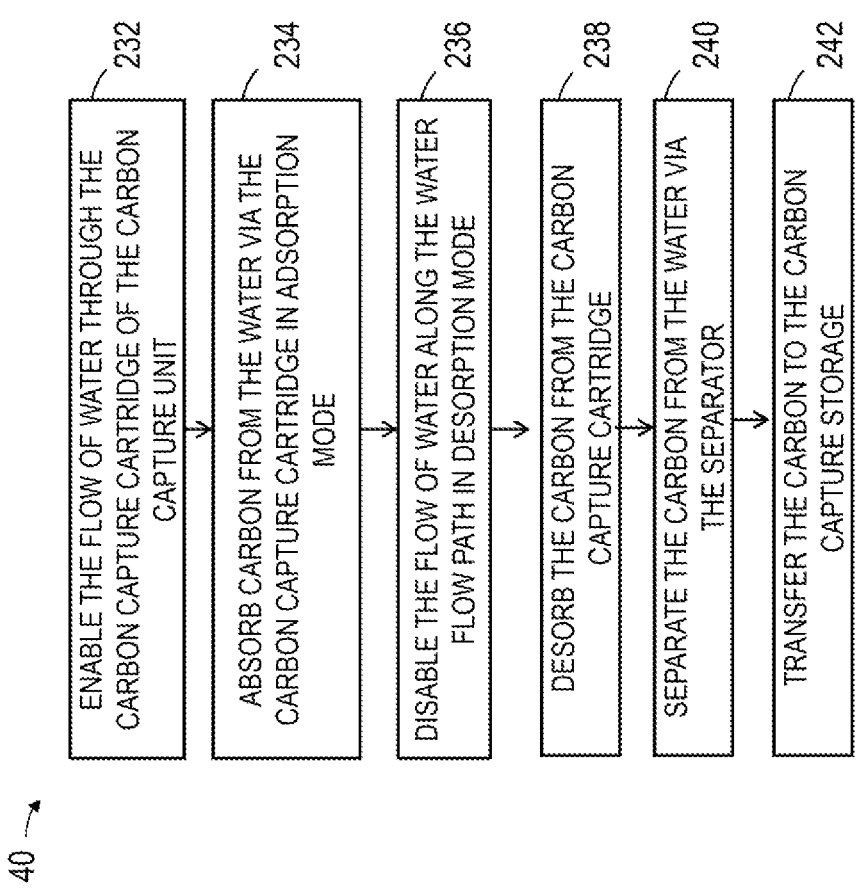
FIG. 6 is a flowchart of an example process for operation of the carbon capture system of FIG. 3 in a first operational mode and a second operational mode, according to an embodiment of the present disclosure.

FIG. 6 is a flowchart of an embodiment of a process for operation of the carbon capture system 40 of FIG. 3 in a first operational mode (e.g., adsorption mode) and a second operational mode (e.g., desorption mode). The carbon capture system 40 includes the carbon capture unit 62 including the carbon capture cartridge 64 and the adjustable mount 72 used to mount the carbon capture unit 62 at an underwater location having underwater equipment. In some embodiments, the controller 74 includes the processor 76, the memory 78 and the instructions 80 stored on the memory 78 and executable by the processor 76 to control the carbon capture system 40. At process block 232, the controller 74 enables the flow of the water along the water flow path 152 through the carbon capture cartridge 64 during the adsorption mode. At process block 234, the carbon capture cartridge 64 adsorbs the carbon from the water into the sorbent material 164 during operation of the adsorption mode.

At process block 236, the controller 74 controls the flow control 70 (e.g., deactivates pumps 161 and 162 and closes valves 158 and 160) to disable the flow of the water along the water flow path 152 and close the housing 156 from the surrounding water to initiate the desorption mode. At process block 238, the carbon capture cartridge 64 desorbs the carbon from the sorbent material 164 into the water contained within the housing 156 to generate a fluid output (e.g., carbon capture fluid) for further processing. Further, at process block 240, the separator 130 separates the carbon (e.g., $CO_2$) from the water. For example, the fluid output (e.g., carbon capture fluid) from the desorption process may be processed by the fluid handling equipment 124 to prepare the carbon for storage. As such, at process block 242, the carbon is transferred from the fluid handling equipment 124 to the carbon capture storage 136 including at least one or a combination of the tank 138, the reservoir 140, the pipeline 142, or the surface vessel 144. In this way, the carbon capture system 40 is able to store carbon and prevent buildup of organic growth on the surface of the underwater equipment.

The technical effect of the disclosed embodiments is to reduce or inhibit biological growth in an underwater environment surrounding underwater equipment, particularly underwater equipment that transfers heat into the surrounding water causing an increased risk of biological growth on the underwater equipment. The underwater equipment may include oil and gas equipment, such as associated with oil and gas wells. The disclosed embodiments simultaneously reduce or inhibit biological growth while also capturing carbon from the water and using waste heat to help with the carbon capture process. For example, the carbon capture helps to improve the environment while inhibiting the biological growth, and does so using waste heat in the underwater equipment. The waste heat may be associated with fluid flows through the underwater equipment, such as heat associated with producing fluids from a subterranean oil and gas well. The waste heat may be used for generating electricity to power the carbon capture system and/or for heat transfer during a desorption mode of the carbon capture system. Accordingly, the technical effect of the disclosed embodiments is both an environmental improvement and a protective measure for the underwater equipment.

The subject matter described in detail above may be defined by one or more clauses, as set forth below.

A system includes a carbon capture unit having a housing with a water inlet, a water outlet, and a water flow path from the water inlet to the water outlet. The carbon capture unit also includes a carbon capture cartridge disposed in the housing along the water flow path, wherein the carbon capture cartridge is configured to capture carbon from water along the water flow path. The carbon capture unit also includes a mount coupled to the housing, wherein the mount is configured to mount the carbon capture unit at an underwater location having underwater equipment.

The system of the preceding clause, wherein the carbon capture cartridge includes a sorbent material configured to adsorb the carbon from the water.

The system of any preceding clause, wherein the carbon capture cartridge includes an electrodeionization system configured to remove the carbon from the water using a membrane demineralization process.

The system of any preceding clause, wherein the carbon capture unit includes a pump disposed in the housing along the water flow path.

The system of any preceding clause, wherein the carbon capture unit includes first and second valves disposed in the housing along the water flow path on opposite sides of the carbon capture cartridge, the first and second valves are configured to open to enable water flow during a first operational mode, and the first and second valves are configured to close to define a closed volume around the carbon capture cartridge during a second operational mode.

The system of any preceding clause wherein the first operational mode is an adsorption mode configured to adsorb the carbon into a sorbent material in the carbon capture cartridge, and the second operational mode is a desorption mode configured to desorb the carbon from the sorbent material in the carbon capture cartridge.

The system of any preceding clause, wherein the underwater equipment is configured to provide heat to the carbon capture unit to facilitate the desorption mode, and the underwater equipment comprises a tree coupled to a subterranean well.

The system of any preceding clause, further including at least one heat exchanger configured to transfer the heat to the sorbent material from a well fluid flowing through the tree.

The system of any preceding clause, further including the underwater equipment having a tree of a subterranean well, wherein the carbon capture unit is mounted to the tree via the mount.

The system of any preceding clause, further including at least one of: a first remotely operated vehicle (ROV) coupling attached to the carbon capture cartridge, wherein the first ROV coupling is configured to enable a ROV to install and remove the carbon capture cartridge relative to the housing; or a second ROV coupling attached to the housing, wherein the second ROV coupling is configured to enable the ROV to install and remove the carbon capture unit relative to the underwater equipment.

The system of any preceding clause, further including a carbon capture system having the carbon capture unit, fluid handling equipment, and carbon capture storage configured to store the carbon, wherein the fluid handling equipment includes at least one of a manifold, a pump, or a separator, wherein the carbon capture storage includes at least one of a tank, a reservoir, a pipeline, or a surface vessel.

The system of any preceding clause, further including a carbon capture system having the carbon capture unit coupled to a controller, wherein the controller includes a memory, a processor, and instructions stored on the memory and executable by the processor to control the carbon capture system to: enable a flow of the water along the water flow path through the carbon capture cartridge during a first operation mode; and adsorb the carbon from the water via the carbon capture cartridge during the first operational mode, wherein the first operational mode comprises an adsorption mode.

The system of any preceding clause, wherein the processor of the controller is further configured to control the carbon capture system to: disable the flow of the water along the water flow path during a second operational mode; desorb the carbon from the carbon capture cartridge during the second operational mode, wherein the second operational mode includes a desorption mode; separate the carbon from the water via a separator; and transfer the carbon to a carbon capture storage including at least one of a tank, a reservoir, a pipeline, or a surface vessel.

The system of any preceding clause, wherein the processor of the controller is further configured to control the carbon capture system to: monitor at least one parameter indicative of biological growth or conditions conducive to biological growth in the water; compare the at least one parameter to a threshold to obtain a comparison; and control the carbon capture system based on the comparison.

A system includes a carbon capture system having a carbon capture unit with a carbon capture cartridge and a mount configured to mount the carbon capture unit at an underwater location having underwater equipment. The carbon capture system further includes a controller comprising a memory, a processor, and instructions stored on the memory and executable by the processor to control the carbon capture system to: enable a flow of water along a water flow path through the carbon capture cartridge during a first operation mode; and adsorb the carbon from the water via the carbon capture cartridge during the first operational mode, wherein the first operational mode includes an adsorption mode.

The system of the preceding clause, wherein the processor of the controller is further configured to control the carbon capture system to: disable the flow of the water along the water flow path during a second operational mode; desorb the carbon from the carbon capture cartridge during the second operational mode, wherein the second operational mode includes a desorption mode; separate the carbon from the water via a separator; and transfer the carbon to a carbon capture storage including at least one of a tank, a reservoir, a pipeline, or a surface vessel.

The system of any preceding clause, wherein the processor of the controller is further configured to control the carbon capture system to: monitor at least one parameter indicative of biological growth or conditions conducive to biological growth in the water; compare the at least one parameter to a threshold to obtain a comparison; and control the carbon capture system based on the comparison.

A method includes operating a carbon capture system underwater to capture carbon from water at an underwater location having underwater equipment, wherein the carbon capture system includes a carbon capture unit having a carbon capture cartridge and a mount configured to mount the carbon capture unit. The method includes controlling the carbon capture system to: enable a flow of the water along a water flow path through the carbon capture cartridge during a first operation mode; and adsorb the carbon from the water via the carbon capture cartridge during the first operational mode, wherein the first operational mode includes an adsorption mode.

The method of the preceding clause, wherein controlling the carbon capture system further comprises controlling the carbon capture system to: disable the flow of the water along the water flow path during a second operational mode; desorb the carbon from the carbon capture cartridge during the second operational mode, wherein the second operational mode includes a desorption mode; separate the carbon from the water via a separator; and transfer the carbon to a carbon capture storage including at least one of a tank, a reservoir, a pipeline, or a surface vessel.

The method of any preceding clause, wherein controlling the carbon capture system further comprises controlling the carbon capture system to: monitor at least one parameter indicative of biological growth or conditions conducive to biological growth in the water; compare the at least one parameter to a threshold to obtain a comparison; and control the carbon capture system based on the comparison.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
a carbon capture unit comprising:
a housing having a water inlet, a water outlet, and a water flow path from the water inlet to the water outlet;
a carbon capture cartridge disposed in the housing along the water flow path, wherein the carbon capture cartridge is configured to capture carbon, comprising a dissolved carbon-containing gas, from water along the water flow path;
first and second valves disposed in the housing along the water flow path on opposite sides of the carbon capture cartridge, the first and second valves being configured to open to enable water flow during a first operational mode, and the first and second valves being configured to close to define a closed volume around the carbon capture cartridge during a second operational mode; and
a mount coupled to the housing, wherein the mount is configured to mount the carbon capture unit under a surface of a body of water at an underwater location having underwater equipment.

2. The system of claim 1, wherein the carbon capture cartridge comprises a sorbent material configured to adsorb the carbon from the water.

3. The system of claim 1, wherein the carbon capture cartridge comprises an electrodeionization system configured to remove the carbon from the water using a membrane demineralization process.

4. The system of claim 1, wherein the carbon capture unit comprises a pump disposed in the housing along the water flow path.

5. The system of claim 1, wherein the first operational mode is an adsorption mode configured to adsorb the carbon into a sorbent material in the carbon capture cartridge, and the second operational mode is a desorption mode configured to desorb the carbon from the sorbent material in the carbon capture cartridge.

6. The system of claim 5, wherein the underwater equipment is configured to provide heat to the carbon capture unit to facilitate the desorption mode, and the underwater equipment comprises a subsea tree coupled to a subterranean well.

7. The system of claim 6, further comprising at least one heat exchanger configured to transfer the heat to the sorbent material from a well fluid flowing through the subsea tree.

8. The system of claim 1, wherein the underwater equipment comprises a subsea tree of a subterranean well, wherein the carbon capture unit is mounted to the subsea tree via the mount.

9. The system of claim 1, further comprising at least one of:
- a first remotely operated vehicle (ROV) coupling attached to the carbon capture cartridge, wherein the first ROV coupling is configured to enable a ROV to install and remove the carbon capture cartridge relative to the housing while the ROV is deployed under the surface of the body of water; or
- a second ROV coupling attached to the housing, wherein the second ROV coupling is configured to enable the ROV to install and remove the carbon capture unit relative to the underwater equipment while the ROV is deployed under the surface of the body of water.

10. The system of claim 1, further comprising a carbon capture system including the carbon capture unit, fluid handling equipment, and carbon capture storage configured to store the carbon, wherein the fluid handling equipment comprises at least one of a manifold, a pump, or a separator, and wherein the carbon capture storage comprises at least one of a tank, a reservoir, a pipeline, or a surface vessel.

11. The system of claim 1, further comprising a carbon capture system including the carbon capture unit coupled to a controller, wherein the controller comprises a memory, a processor, and instructions stored on the memory and executable by the processor to control the carbon capture system to:
- enable the flow of the water along the water flow path through the carbon capture cartridge during the first operation mode; and
- adsorb the carbon from the water via the carbon capture cartridge during the first operational mode, wherein the first operational mode comprises an adsorption mode.

12. The system of claim 11, wherein the instructions are further executable by the processor to control the carbon capture system to:
- disable the flow of the water along the water flow path during the second operational mode;
- desorb the carbon from the carbon capture cartridge during the second operational mode, wherein the second operational mode comprises a desorption mode;
- separate the carbon from the water via a separator; and
- transfer the carbon to a carbon capture storage comprising at least one of a tank, a reservoir, a pipeline, or a surface vessel.

13. The system of claim 11, wherein the instructions are further executable by the processor to control the carbon capture system to:
- monitor at least one parameter indicative of biological growth or conditions conducive to biological growth on the underwater equipment or in the water around the underwater equipment;
- compare the at least one parameter to a threshold to obtain a comparison; and
- control the carbon capture system based on the comparison.

14. The system of claim 1, wherein the carbon comprises carbonates, carbonic acid, carbon dioxide ($CO_2$), or any combination thereof.

15. The system of claim 1, wherein the dissolved carbon-containing gas comprises a dissolved carbon dioxide ($CO_2$) in the water.

16. A system comprising:
- a carbon capture unit comprising:
  - a housing having a water inlet, a water outlet, and a water flow path from the water inlet to the water outlet;
  - a carbon capture cartridge disposed in the housing along the water flow path, wherein the carbon capture cartridge is configured to capture carbon, comprising a dissolved carbon-containing gas, from water along the water flow path; and
- a mount coupled to the housing, wherein the mount is configured to mount the carbon capture unit under a surface of a body of water at an underwater location having underwater equipment, wherein the underwater equipment comprises a subsea tree of a subterranean well, wherein the carbon capture unit is mounted to the subsea tree via the mount.

17. The system of claim 16, wherein the carbon capture cartridge comprises a sorbent material configured to adsorb the carbon from the water.

18. The system of claim 16, wherein the carbon capture cartridge comprises an electrodeionization system configured to remove the carbon from the water using a membrane demineralization process.

19. The system of claim 16, wherein the carbon capture unit comprises a pump disposed in the housing along the water flow path.

20. A system comprising:
- a carbon capture unit comprising:
  - a housing having a water inlet, a water outlet, and a water flow path from the water inlet to the water outlet;
  - a carbon capture cartridge disposed in the housing along the water flow path, wherein the carbon capture cartridge is configured to capture carbon, comprising a dissolved carbon-containing gas, from water along the water flow path;
- a mount coupled to the housing, wherein the mount is configured to mount the carbon capture unit under a surface of a body of water at an underwater location having underwater equipment; and
- at least one of:
  - a first remotely operated vehicle (ROV) coupling attached to the carbon capture cartridge, wherein the first ROV coupling is configured to enable a ROV to install and remove the carbon capture cartridge relative to the housing while the ROV is deployed under the surface of the body of water; or
  - a second ROV coupling attached to the housing, wherein the second ROV coupling is configured to enable the ROV to install and remove the carbon capture unit relative to the underwater equipment while the ROV is deployed under the surface of the body of water.

21. The system of claim 20, wherein the carbon capture cartridge comprises a sorbent material configured to adsorb the carbon from the water.

22. The system of claim 20, wherein the carbon capture cartridge comprises an electrodeionization system configured to remove the carbon from the water using a membrane demineralization process.

* * * * *